United States Patent
Patil et al.

(10) Patent No.: US 11,570,240 B2
(45) Date of Patent: Jan. 31, 2023

(54) SYSTEM AND METHOD FOR DIAMETER MESSAGING IN COMPUTER NETWORKS

(71) Applicant: SANDVINE CORPORATION, Waterloo (CA)

(72) Inventors: Rajeshwar Patil, Bengaluru (IN); Shailesh Devaraj, Bangalore (IN)

(*) Notice: Subject to any disclaimer, the term of this patent is extended or adjusted under 35 U.S.C. 154(b) by 0 days.

(21) Appl. No.: 17/343,005

(22) Filed: Jun. 9, 2021

(65) Prior Publication Data

US 2021/0385270 A1 Dec. 9, 2021

(30) Foreign Application Priority Data

Jun. 9, 2020 (IN) ............... 202011024183

(51) Int. Cl.
| | | |
|---|---|---|
| G06F 15/173 | (2006.01) | |
| H04L 67/1023 | (2022.01) | |
| H04L 67/1034 | (2022.01) | |
| H04L 67/1004 | (2022.01) | |
| H04L 67/1014 | (2022.01) | |

(52) U.S. Cl.
CPC ...... *H04L 67/1023* (2013.01); *H04L 67/1004* (2013.01); *H04L 67/1014* (2013.01); *H04L 67/1034* (2013.01)

(58) Field of Classification Search
CPC .......... H04L 67/1023; H04L 67/1002; H04L 67/1004; H04L 67/1014; H04L 67/1034; H04L 67/327; H04L 67/01; H04L 67/10015; H04L 9/40

See application file for complete search history.

(56) References Cited

U.S. PATENT DOCUMENTS

| | | | | |
|---|---|---|---|---|
| 2010/0299451 A1* | 11/2010 | Yigang | ................. | H04L 65/80 709/241 |
| 2012/0158872 A1* | 6/2012 | McNamee | ............. | H04L 69/40 709/206 |
| 2012/0224524 A1* | 9/2012 | Marsico | ............. | H04L 67/2804 370/328 |
| 2012/0224531 A1* | 9/2012 | Karuturi | ............... | H04W 40/02 370/328 |

(Continued)

OTHER PUBLICATIONS

European Patent Office, European Search Report for Corresponding EP Pat. App No. 21178590.2, dated Oct. 7, 2021.

(Continued)

*Primary Examiner* — Johnny B Aguiar
(74) *Attorney, Agent, or Firm* — Amarok IP Inc.; Neil W. Henderson

(57) ABSTRACT

A system and method for diameter agent load balancing. The method including: receiving a request from a sending diameter node; parsing at least one Attribute-Value Pair (AVP) from the request; determining a partition-identifier (partition-id) from the at least one AVP; determining a receiving diameter node, based on the partition-id; and sending the request to the receiving diameter node. The system including: a message module configured to receive a request from a sending diameter node; a parsing module configured to parse at least one Attribute-Value Pair (AVP) of the message from the request and determine a partition-id from the at least one AVP and a receiving diameter node, based on the partition-id; and a forwarding module configured to send the request to the receiving diameter node.

12 Claims, 13 Drawing Sheets

(56) References Cited

U.S. PATENT DOCUMENTS

2012/0225679 A1* 9/2012 McCann ............. H04L 12/1407
455/466
2012/0226758 A1* 9/2012 Sprague ............. H04L 63/0892
709/206
2014/0304415 A1* 10/2014 Prakash ............. H04L 63/0272
709/226

OTHER PUBLICATIONS

Wang De-Min et al., "Message-oriented Load Balancing Algorithm", ??????, vol. 42, No. 1, pp. 141-142, Sep. 1, 2012 XP055845413, Retrieved from the Internet:URL:http://xuebao.jlu.edu.cn/gxb/CN/abstra ct/abstract11254.shtml>[retrieved on Sep. 28, 2021].

Anonymous: "Message-Based Load Balancing : F5", • Nov. 26, 2009 (Nov. 26, 2009), XP055845508, Retrieved from the Internet: URL:https://www.f5.com/services/resources/ white-papers/message-based-load-balancing [retrieved on Sep. 28, 2021].

* cited by examiner

SYSTEM AND METHOD FOR DIAMETER MESSAGING IN COMPUTER NETWORKS

RELATED APPLICATION

The present disclosure claims priority to Indian Patent Application No. 202011024183 filed Jun. 9, 2020, which is hereby incorporated in its entirety herein.

FIELD

The present disclosure relates generally to management of computer network traffic. More particularly, the present disclosure relates to a system and method for diameter load balancing.

BACKGROUND

Network traffic continues to increase all over the world. As network traffic increases, service providers or network managers try to optimize the use of their networks in order to maximize customer satisfaction and throughput on the network. A computer network uses various devices and requires protocols to manage traffic between network devices. One such protocol is called the diameter protocol. Diameter is an authentication, authorization, and accounting protocol for computer networks.

A Diameter node may act as a client, server, or agent in the computer network. The Diameter node that receives a user connection request will act as the client. The Diameter server node is then a node in the computer network that authenticates the user. A Diameter agent is then intended to route messages from the client or server to another client or server. In order to ensure that the traffic is routed properly, conventional agents are generally required to store data associated with a plurality of clients and servers to determine where specific messages should be sent. The time taken in storing the data may use memory and processing power that may slow the network traffic, thus potentially lowering the Quality of Experience (QOE) of the network subscribers.

It is, therefore, desirable to provide an improved method and system for diameter load balancing.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for diameter agent load balancing, the method including: receiving a request from a sending diameter node; parsing at least one Attribute-Value Pair (AVP) from the request; determining a partition-id from the at least one AVP; determining a receiving diameter node, based on the partition-id; and sending the request to the receiving diameter node.

In some cases, the at least one AVP may be an Origin-Host AVP or a Session-ID AVP.

In some cases, the method may further include: determining the partition-id associated with each subscriber of a plurality of subscribers; mapping the partition-id to at least one diameter node; and storing the mapping in a table.

In some cases, the method may further include: receiving a message indicating a failure of at least one diameter node; and remapping the partition-id based on the at least one failure.

In some cases, the sending diameter node may be a client node or a server node.

In some cases, if the sending node is a client node, the receiving node may be a server node, or if the sending node is a server node, the receiving node may be a client node.

In some cases, the table may be stored at a load balancing diameter node.

In some cases, the partition id may be based on a hash of the subscriber identity.

In some cases, the method may further include encoding the partition-id into the at least one AVP of the request.

In another aspect, there is provided a system for diameter agent load balancing, the system including: a message module configured to receive a request from a sending diameter node; a parsing module configured to parse at least one Attribute-Value Pair (AVP) of the message from the request and determine a partition-id from the at least one AVP and a receiving diameter node, based on the partition-id; and a forwarding module configured to send the request to the receiving diameter node.

In some cases, the at least one AVP may by an Origin-Host AVP or a Session-ID AVP.

In some cases, the system may further include: a processor configured to determine the partition-id associated with each subscriber of a plurality of subscribers and map the partition-id to at least one diameter node; and a memory component configured to store the mapping in a table.

In some cases, the processor is configured to detect a message indicating a failure of at least one diameter node; and an update module is configured to remap the partition-id based on the at least one failure.

In some cases, the sending diameter may be is a client node or a server node.

In some cases, if the sending node is a client node, the receiving node may be a server node, or if the sending node is a server node, the receiving node may be a client node.

In some cases, the table may be stored at a load balancing diameter node.

In some cases, the partition-id may be based on a hash of the subscriber identity.

In some cases, the system may further include at least one client node or at least one server node and the at least one client node or at least one server node is configured to encode the partition-id into the at least one AVP.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
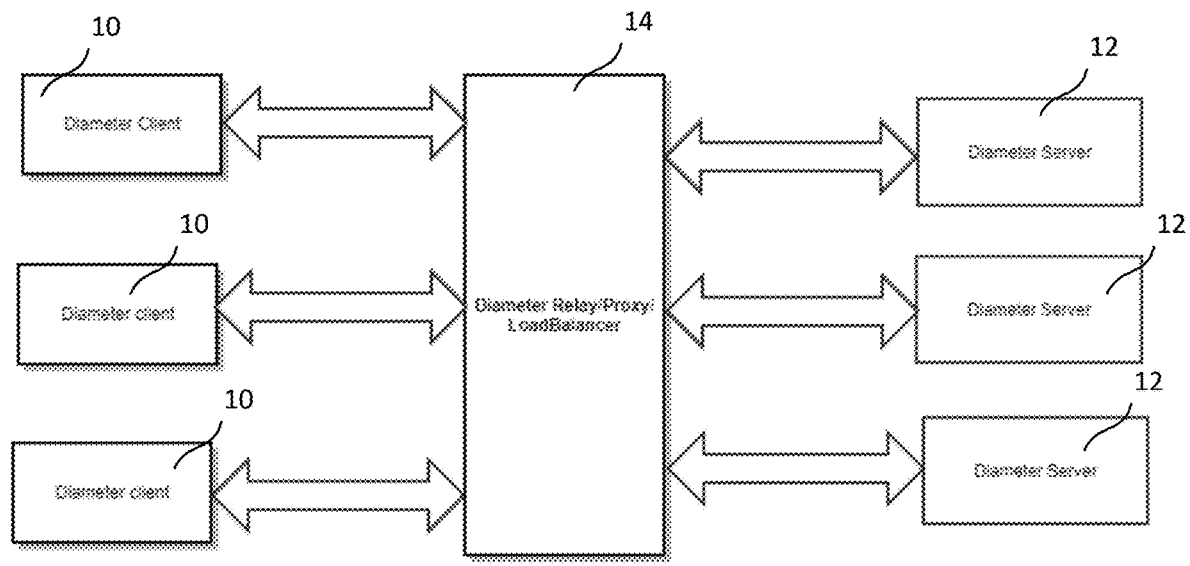
FIG. 1 illustrates an overview of a conventional diameter client and server relationship.

Generally, the present disclosure provides a method and system for diameter load balancing and, in particular, stateless diameter agent load balancing. Within the Diameter protocol, a Diameter agent generally includes a table, which provides data for each subscriber and is modified or updated as subscribers move across clusters. It is intended that each subscriber is grouped into sets or partitions, which may be done in various manners, for example: each subscriber could be its own partition, where Partition-id could be subName or hash of the subscriberName; subscribers could be partitioned using the IP address allocated to the subscriber; or other ways intended to classify or otherwise identify subscribers or groups of subscribers. In this document, partition-id is intended to define a key that is used for one or a group of subscribers. Partition-id could be derived using hashing subscriber name, Internet Protocol Address (IP-Address), Location, or the like.

In embodiments of the method and system, the Diameter agent receives a message from a Diameter server or client. The Diameter message is configured to include data on the Attribute Value Pair (AVP) associated with the partition-id of the subscriber associated with the message, the Diameter server or client is configured to encode the partition-id into the AVP of the message. The diameter agent is configured to parse the message to determine the partition-id and forward the message to the correct recipient. In a situation where a diameter client or server has had a failure, or has had a subscriber move from the client or server in order to better balance the network traffic, the table will be updated to provide for the updated association between partition-id and subscriber. On receipt of a new message, the Diameter message will be forwarded to the correct recipient based on the partition-id associated with the message.

The diameter base protocol is generally intended to provide an Authentication, Authorization, and Accounting (AAA) framework for applications such as network access or Internet Protocol (IP) mobility in both local and roaming situations. Conventionally, diameter agents have had to be stateful to route the messages in a failover cluster, in that diameter agents retain the state of the various nodes.

Generally, any node can initiate a request. In that sense, Diameter is a peer-to-peer protocol. In this document, a Diameter client may be a device at the edge of the network that performs access control, such as a Network Access Server (NAS) or a Foreign Agent (FA). A Diameter client generates Diameter messages to request authentication, authorization, and accounting services for the user. A Diameter agent is a node that does not provide local user authentication or authorization services; agents include proxies, redirects, and relay agents. A Diameter server performs authentication and/or authorization of the user. In some cases, a Diameter node may act as an agent for various requests while acting as a server for other requests.

The Diameter protocol is also intended to support server-initiated messages, such as a request to abort service to a particular user. The base Diameter protocol tends to provide for establishing connections to peers, capabilities negotiation, how messages are sent and routed through peers, how the connections are eventually closed or torn down, and the like. The base protocol may also define certain rules that can apply to all message exchanges between Diameter nodes.

Communication between Diameter peers begins with one peer sending a message to another Diameter peer. The set of Attribute Value Pairs (AVPs) included in the message is determined by a Diameter application. One AVP that tends to be included to reference a user's session is the Session-Id; although there may also be other AVPs, for example identify the subscribers with, for example, Subscription-Id AVP. The Subscription-Id AVP (AVP Code 443) is used to identify the end user's subscription and may be, for example, of type Grouped. The Subscription-Id AVP includes a Subscription-Id-Data AVP that holds the identifier and a Subscription-Id-Type AVP that defines the identifier type.

In Diameter messaging, there is also User-Equipment-Info AVP. The User-Equipment-Info AVP (AVP Code 458) can be of type Grouped and allows the credit-control client to indicate the identity and capability of the terminal the subscriber is using for the connection to network.

There are many further AVPs that can be used. The example AVPs noted may be intended to carry the subscriber's International Mobile Subscriber Identity (IMSI), International Mobile Equipment Identity (IMEI), mobile number, user-id, and similar data to identify the subscriber. One of these AVPs is intended to be used to uniquely identify the subscriber. The initial request for authentication and/or authorization of a user often includes the Session-Id AVP. Session-Id is generated by the session initiating diameter node, and it is intended to be globally unique. In some cases, the Session-Id may then be used in all subsequent messages to identify the user's session. The communicating party may accept the request or reject it by returning an answer message with the Result-Code AVP set to indicate that an error occurred. The specific behavior of the Diameter server or client receiving a request depends on the Diameter application employed.

The base Diameter protocol may be used by itself for accounting applications. For authentication and authorization, the Diameter protocol can be extended for a particular application. Diameter relays and redirect agents are intended to be transparent to the Diameter applications, but they are intended to support the Diameter base protocol, which includes accounting, and all Diameter applications. Diameter proxies support the base protocol, which includes accounting. In addition, Diameter proxies support each Diameter application that may be needed to implement the proxy services.

Request forwarding is generally done using a Diameter peer table. The Diameter peer table contains the peers with which the local node is able to directly communicate. When a request is received, and the host encoded in the Destination-Host AVP is one that is present in the peer table, the message is intended to be forwarded to the peer.

Diameter request message routing is generally done via realms and Application Ids. A Diameter messages that may be forwarded by Diameter agents (proxies, redirect agents, or relay agents) are intended to include the target realm in the Destination-Realm AVP. Request routing may rely on the Destination-Realm AVP and the Application Id present in the request message header to aid in the routing decision. Diameter agents may have a list of locally supported realms and applications, and the agents may also have a list of externally supported realms and applications. When a request is received that includes a realm and/or application that is not locally supported, the message is routed to the peer configured in the routing table. Realm names and Application Ids are sometimes considered to be the minimum supported routing criteria, and additional information may be needed to support redirect semantics.

A request that needs to be sent to a specific server/client among those serving a given realm would normally contain both the Destination-Realm and Destination-Host AVPs. Destination-Host is set to the value received in the Origin-Host AVP in the message from destination end node.

Further AVPs may be considered as base Diameter AVPs. A few examples of base Diameter AVPs include Origin-Host AVP, Destination-Host AVP, and Destination-Realm AVP. The Origin-Host AVP (AVP Code 264) is of type string, and it tends to be present in all Diameter messages. This AVP identifies the endpoint that originated the Diameter message. Relay agents do not generally modify the AVPs. The value of the Origin-Host AVP is intended to be unique within a single host.

The Destination-Host AVP (AVP Code 293) is typically of type string. This AVP is generally present in all unsolicited agent initiated messages, and may also be present in request messages. This AVP does not tend to be present in answer messages. The absence of the Destination-Host AVP will cause a message to be sent to any Diameter server supporting the application within the realm specified in Destination-Realm AVP.

The Destination-Realm AVP (AVP Code 283) is of type DiameterIdentity and contains the realm to which the message is to be routed. The Destination-Realm AVP will not be present in answer messages. Diameter servers initiating a request message use the value of the Origin-Realm AVP from a previous message received from the intended target host (unless it is known a priori). When present, the Destination-Realm AVP is used to perform message routing decisions.

The Diameter nodes tend to be thought of as a Diameter Client, a Diameter Server, a Proxy Agent or Proxy and a Relay Agent or Relay. FIG. 1 illustrates an example of the types of interaction between different Diameter nodes in a conventional solution.

A Diameter client 10 is a Diameter node that supports Diameter client applications as well as the base protocol. Diameter clients are often implemented in devices situated at the edge of a network and provide access control services for that network. Typical examples of Diameter clients include the Packet Data Network Gateway (P-GW), Gateway General Packet Radio Service (GPRS) Support Node (GGSN), Network Access Server, (NAS) and the Mobile IP Foreign Agent (FA).

A Diameter server 12 is a Diameter node that handles authentication, authorization, and accounting requests for a particular realm. A Diameter server supports Diameter server applications in addition to the base protocol.

A Proxy Agent 14 in addition to forwarding requests and responses, can make policy decisions relating to resource usage and provisioning. Typically, this is accomplished by tracking the state of NAS devices. While proxies usually do not respond to client requests prior to receiving a response from the server, the proxy may originate Reject messages in cases where policies are violated. As a result, proxy agents 14 are configured to determine the semantics of the messages passing through them, and the proxy agents 14 may not support all Diameter applications.

Relays, which may be a part of or in addition to a Proxy Agent, forward requests and responses based on routing-related AVPs and routing table entries. Since relays do not make policy decisions, the relays do not tend to examine or alter non-routing AVPs. As a result, relays generally do not originate messages, do not necessarily understand the semantics of messages or non-routing AVPs, and are capable of handling any Diameter application or message type. Since relays make decisions based on information in routing AVPs and realm forwarding tables, the relays do not tend to keep state on network attached storage (for example, NAS) resource usage or sessions in progress.

Except as noted, a Diameter agent tends to be stateful in that the agents store the state of every session/subscriber until the subscriber has logged out or the session has ended. These agents may sometimes be used for load balancing/routing of the diameter messages between diameter client and server.

A partitioned failover cluster (not shown in FIG. 1) is a group of servers/clients that work together to maintain high availability of applications and services. If one of the servers/clients, or nodes, fails, another node in the cluster can take over the failed node's workload without downtime or with minimal downtime (this process is known as failover). The partitioned failover cluster deployment refers to a cluster of nodes where all nodes provide services. Subscribers are divided across a fixed number of partitions, using for example a hash function. In the specific example used herein, a partition number of 1024 is used, but it will be understood that there may be varying numbers of partitions and assigning subscribers among the available partitions may be done in a variety of methods.

Figure 2:
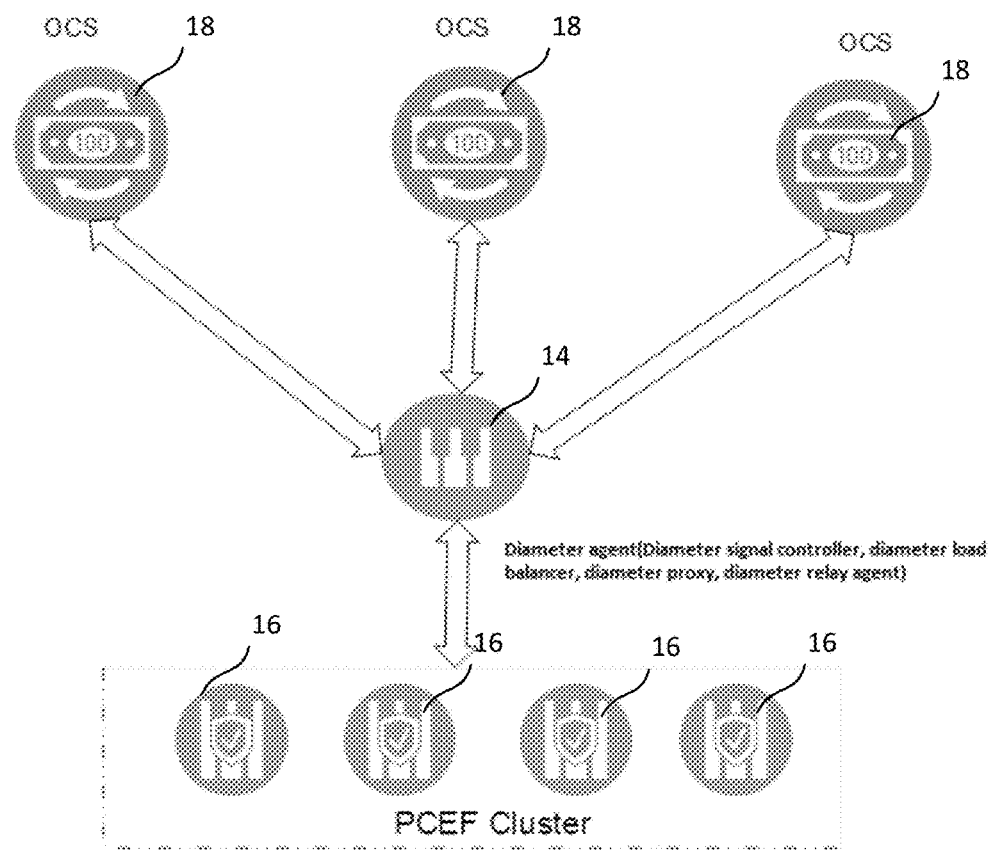
FIG. 2 illustrates a diameter agent according to an example embodiment.

A load-balancer node distributes the partitions across the nodes in the cluster for processing. This process allows for scalability by providing the flexibility to add or remove nodes from the cluster based on network demands. The hash partitioning applies a hash function to subscriber identifying data, for example the subscriber name, id, address, or the like, to yield a partition number for the subscriber. This strategy is intended to provide exact-match queries on the selection attribute to be processed by one node and all other queries to be processed by all the nodes in parallel. A cluster is shown in FIG. 2, which illustrates a plurality of Policy and Charging Enforcement Functions (PCEFs) 16 communicating with a diameter agent 14 which relays messages back and forth with a plurality of Online Charging Systems (OCS) 18.

It has been noted that there are advantages to using clusters, for example: the clusters tend to have scalability and elasticity, which allows the network operator to add nodes to the cluster dynamically. Further, it is often considered to be an efficient hardware utilization as the whole set of nodes serve traffic, there are no idle nodes.

A subscriber is generally associated with a partition-id and not to a particular node. The partitions can move from one node to another node. So if "sub1" with partition-id 2 was on node1, and when node1 fails, all the partitions/subs from node1 are moved across other nodes in the cluster.

Figure 3:
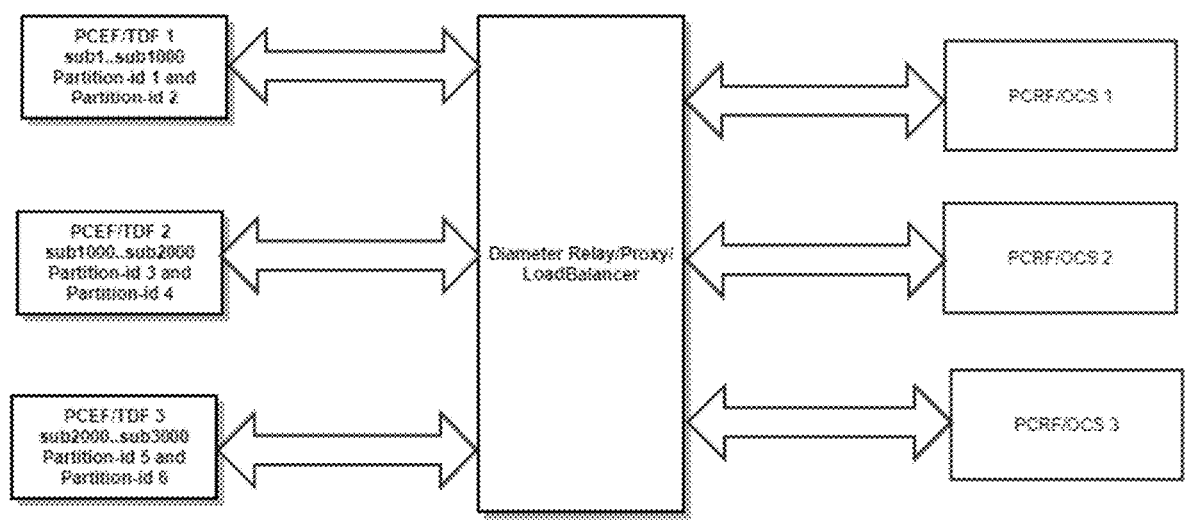
FIG. 3 illustrates a specific example of a diameter client and server interaction.

For example, as shown in FIG. 3,
"sub1 to sub500" could be in Partition-id 1
"sub501 to sub1000" could be in Partition-id 2
"sub1001 to sub1500" could be in Partition-id 3
"sub1501 to sub2000" could be in Partition-id 4
"sub2001 to sub2500" could be in Partition-id 5
"sub2501 to sub3000" could be in Partition-id 6

As shown in FIG. 3, a plurality of partitions may be with a specific node, for example: partition-id 1 and partition-id 2 are on Traffic Detection Function (TDF) 1. In some cases, the subscribers may not be grouped in the partitions and there could be the following ways to partition the subscribers. For example: each subscriber could be its own partition, each partition-id could be subName or hash of the subscriberName; subscribers could be partitioned using the IP address allocated to the subscriber; or other ways which partitions subscribers.

In the examples provided herein, partition-id is intended to define the key that is used for one or a group of subscribers. As is noted, partition-id could be derived in various manners, including, for example, using hashing subscriber name, IP-Address, Location, and the like. The Diameter Agent (which may include both Relay and Proxy aspects) may also be used as diameter load balancer. Embodiments of the system and method for stateless diameter agent load balancing are intended to apply to clusters of diameter clients or/and diameter servers. Clusters of diameter clients has been used as the main example for explanation, but it will be understood that the system and method may apply equally to diameter servers.

Figure 4:
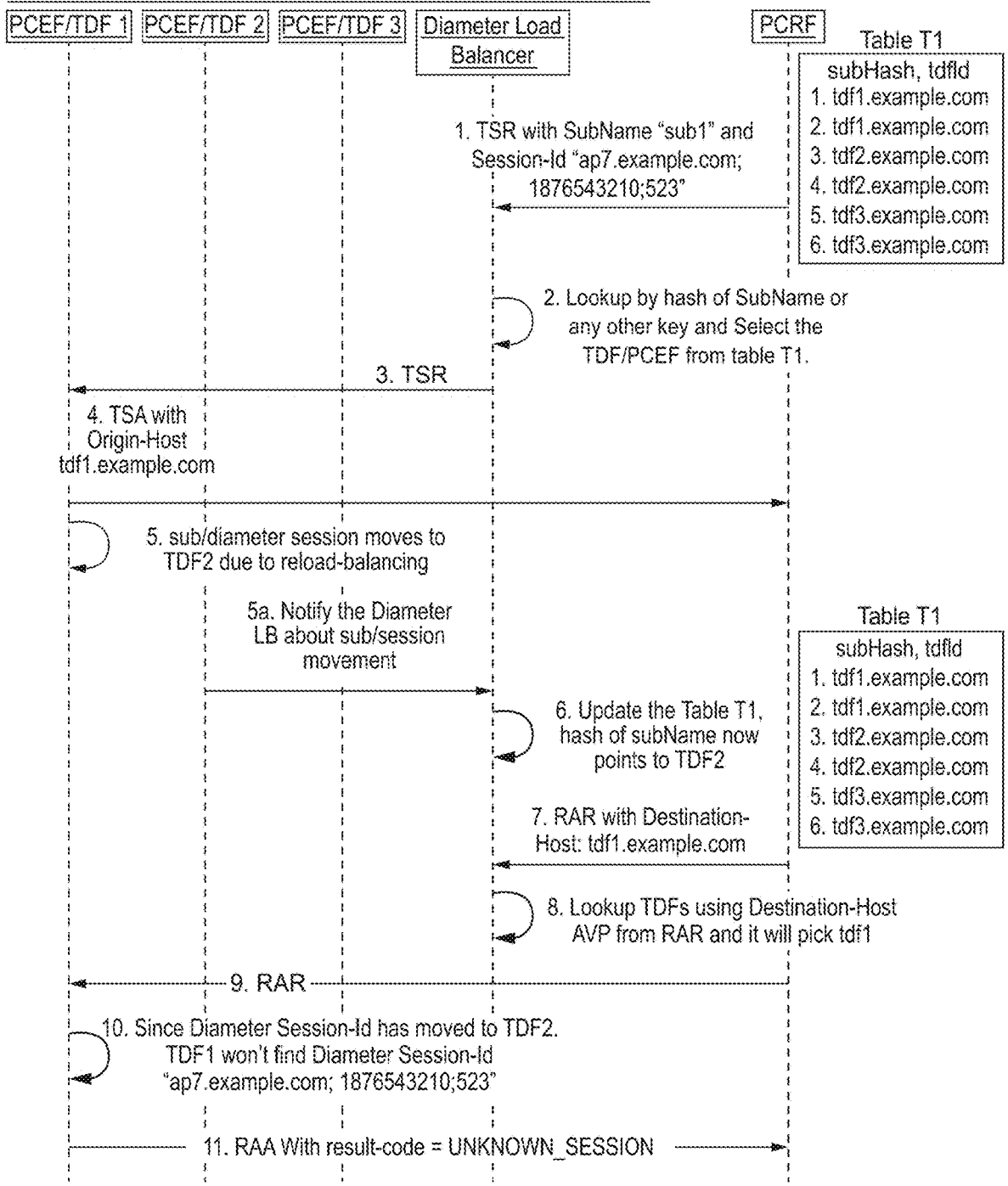
FIG. 4 illustrates a sequence diagram for diameter messaging.

FIG. 4 illustrates the actions of a Diameter agent acting as diameter load balancer as a sequence diagram. The diameter load balancer typically has to maintain state to be able to route the diameter message to the node handling the associated session/subscriber. The session binding to node may move to another node, for example, due to a failure, an explicit movement to rebalance the load, or the like. For these reasons, the state is generally maintained by and persisted on the Diameter agent.

The diameter sessions in a cluster can move across all the nodes in the cluster based on, for example, the addition of new node, deletion of the existing node, failure of the node, load-balancing due to current load on existing nodes, or the like. To support elasticity in the cluster, the new nodes could come and go and the diameter agent is configured to cause a new configuration of load-balancing. A new configuration for load-balancing that involves movement of sessions is not generally reported to the diameter clients or diameter servers. This implies that if sessions move across diameter clients, then diameter servers are unaware of these movements. Similarly, if sessions move across diameter servers, then diameter clients are unaware of these movements.

In cases where sessions are moving across the Diameter Clients, the server initiated messages for the active sessions that have moved may not be delivered to the correct Diameter client in conventional solutions as shown in FIG. 4 of the sequence diagram.

The Diameter Load Balancer/proxy/relay is aware of the partition-id to a Policy Charging Enforcement Function (PCEF) and/or Traffic Detection Function (TDF) mapping. The cluster of clients communicate with each other, and whenever any node in the cluster goes down or new node is added, a communication is sent to each node in the cluster to notified each node of these events. As a load balancer is part of the cluster the load balancer receives the communication of these node addition/deletion/rebalancing events. It is intended for the load balancer to have updated state on which partition belongs to which node in the cluster. Whenever subscribers move across diameter clients, the load balancer is notified and load balancer updates the table T1 in FIG. 4, that has partition-id of subscriberName as key and value as TDF/PCEF ID.

From the sequence diagram, on subscriber login, the Policy and Charging Rules Function (PCRF) sends a TDF-Session-Request (TSR) Message with Subscription-Id AVP with value "sub1" and Session-Id AVP "ap7.example.com; 1876543210;523". The Diameter Load Balancer/relay/proxy (referred to as Diameter Agent) parses Subscription-Id AVP and Session-Id AVP from the subscriber login notification. The Diameter agent may then perform a lookup using hash of Subscription-Id (which in this example may be associated with partition-id) in the table T1 and determines the host where the request is to be sent.

The Diameter TSR is forwarded to the peer found in the analysis of the message, in this case—TDF1. A TDF-Session-Answer (TSA) Message is sent from TDF, with Origin-Host AVP as tdf1.example.com, and the Diameter Agent forwards the response to the PCRF.

In this example, there is a failure and TDF1 goes down, goes offline, is load balanced, or the like. In other cases, a similar result may occur due to some load balancing condition change. In this case, all the diameter sessions from TDF1 are moved across other peers, for example, TDF2 and TDF3. In this case, the partition-id belonging to "sub1" moves to TDF2. The Diameter Agent is notified about the subscriber movement, and the Diameter Agent updates table T1.

The Diameter Agent receives a Re-Auth-Request (RAR) from the PCRF with Destination-Host AVP with value same as sent in Origin-Host of TSA, for example, tdf1.example.com. The Diameter Agent performs a look up in the Diameter peer table keyed by Diameter Identities using Destination-Host AVP, and returns tdf1.example.com. The RAR is sent to TDF1.

The TDF1 then proceeds to look up the Diameter Session-Id in its session table and since Session-Id "ap7.example.com;1876543210;523" has moved to TDF2, TDF1 will not be able to find it in its own Session Table and will return a failure result, for example: DIAMETER_UN-KNOWN_SESSION_ID(5002) in Result-Code AVP.

A Re-Auth-Answer (RAA) is sent back to the Diameter Agent and then Diameter Agent sends it to the PCRF with Result-Code as SESSION_NOT_FOUND.

From this sequence diagram example, the server initiated requests fail when the existing sessions move across the cluster. It will be understood that this result is not desirable for the subscriber or the network operator.

In some cases, the diameter sessions in a cluster can move across all the nodes in the cluster based on the addition of a new node, deletion of an existing node or re load-balancing due to current load on existing nodes. This movement of sessions is not generally informed to the diameter clients/servers. If sessions move across diameter clients, then diameter servers are unaware of these movements. Similarly, if sessions move across diameter servers, then diameter clients are unaware of these movements.

In some cases, sessions are moving across the Diameter Clients, the server initiated messages for the sessions that have moved may not be delivered to the right diameter client. In order to deliver the message to the right client the Diameter Agent is configured to keep the state of each of the clients, for example in the form of tables, and this state is persisted across the cluster of Diameter Agents. Per each of the sessions of each of the subscribers the state is persisted, which can require a significant amount of resources including memory space and processing power.

Figure 5:
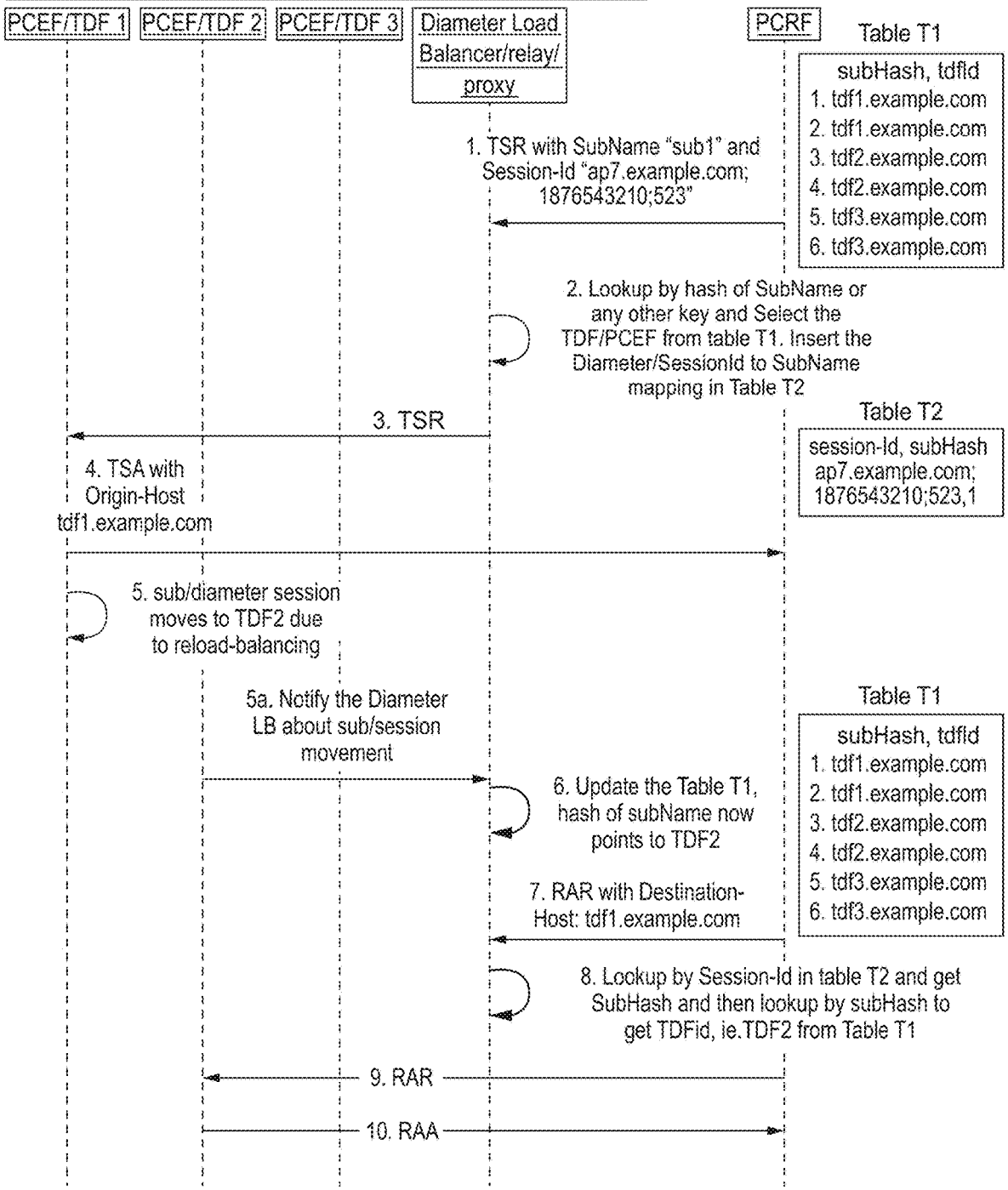
FIG. 5 illustrates another sequence diagram for diameter messaging.

FIG. 5 illustrates an example of a sequence diagram where the diameter agent is stateful or state aware. The Diameter Agent is preconfigured to be aware of the partition-id to PCEF/TDF mapping. When a subscriber moves across diameter clients, the Diameter Agent is notified and is configured to update a record, for example, the Diameter agent may update a table, shown in FIG. 5 as T1, which has partition-id of subscriberName as key and value as TDF/PCEF ID.

In this example, on subscriber login, a PCRF sends the TSR with Subscription-Id AVP with value "sub1" and Session-Id AVP "ap7.example.com;1876543210;523". The Diameter Load Balancer/Relay/Proxy (referred to herein as the Diameter Agent) is configured to parse Subscription-Id AVP and Session-Id AVP. The Diameter Agent may then perform a lookup using, for example, a hash of Subscription-Id (to determine the partition-id) in the table T1 and determine the host where this request is to be sent.

Simultaneously, the Diameter agent is configured to store the Diameter session-Id in a second table, shown in FIG. 5 as T2, along with the determined partition-Id. The Diameter TSR is forwarded to the peer determined from the lookup, in this example, TDF1. The TSA is sent from TDF, with Origin-Host AVP as tdf1.example.com. The Diameter Load Balancer/Relay/Proxy is configured to forward the response to the PCRF.

In this example, TDF1 has a failure or due to some load balancing condition change, all the diameter sessions from TDF1 are moved across other peers. In this example, the sessions may be reallocated to TDF2 and TDF3. In this case, "sub1" moves to TDF2. The Diameter Agent is notified about the subscriber movement. The Diameter Agent updates the table T1.

The Diameter Agent may then receive an RAR from the PCRF with Destination-Host AVP with value that would be the same as sent in Origin-Host of TSA—tdf1.example.com.

The Diameter Agent may perform a look-up the table T2 and retrieve the partition-id from table T2. Then using partition-id the Diameter Agent may further preform a look up in the table T1 to return tdf2.example.com for "sub1".

The RAR is sent to TDF2. The RAA is sent back to the Diameter Agent who forwards the RAA to the PCRF. From the sequence diagram, it is beneficial for the system to ensure that table T2 that needs to be populated, looked up, and persisted across the cluster of Diameter Agent.

This approach may have one or more drawbacks, for example, the Diameter Agent is state aware and it is configured to parse the Diameter Session-Id and store the Diameter session-id to subscriber name mapping; the table keyed by Session-Id might leak entries if the logout (RAR-T) is dropped; the Diameter Agent may use a significant amount of RAM/memory; Diameter Agent performs lookups of table T2 on every diameter request which adds a load to the processor; the table T2 is persisted on disk and replicated to the Diameter Agent cluster for high availability, which adds to processor usage and disk usage; the Diameter Agent stickiness has to be maintained, so a diameter server or client has to always select the same agent for particular session, which may require state information to be saved at the client or server as well; and disk usage may also affect other application as the disk may be a shared resource. It will be understood that there could be several deployments where one load balancer may not be able to handle a high load, so the deployment may include a cluster of load balancers. If state is maintained on a specific load balancer, then the client or server will be required to pick the same load balancer for that session. As such, the client and/or server may also maintain another state in order to choose the same load balancer for a particular session, which provides for the stickiness to be maintained.

Figure 6:
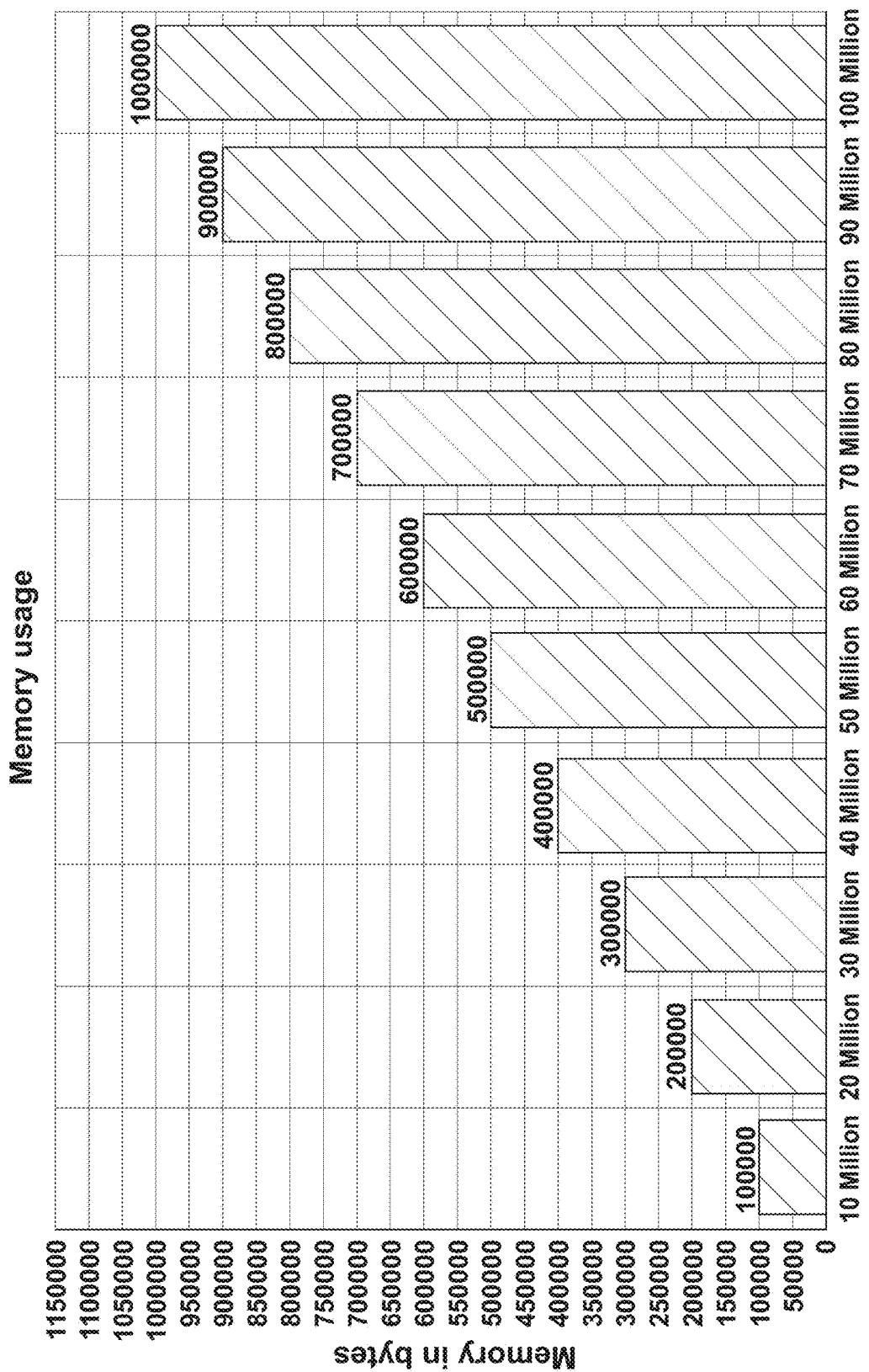
FIG. 6 is a graph that shows the active diameter sessions versus amount of memory conception.
Figure 7:
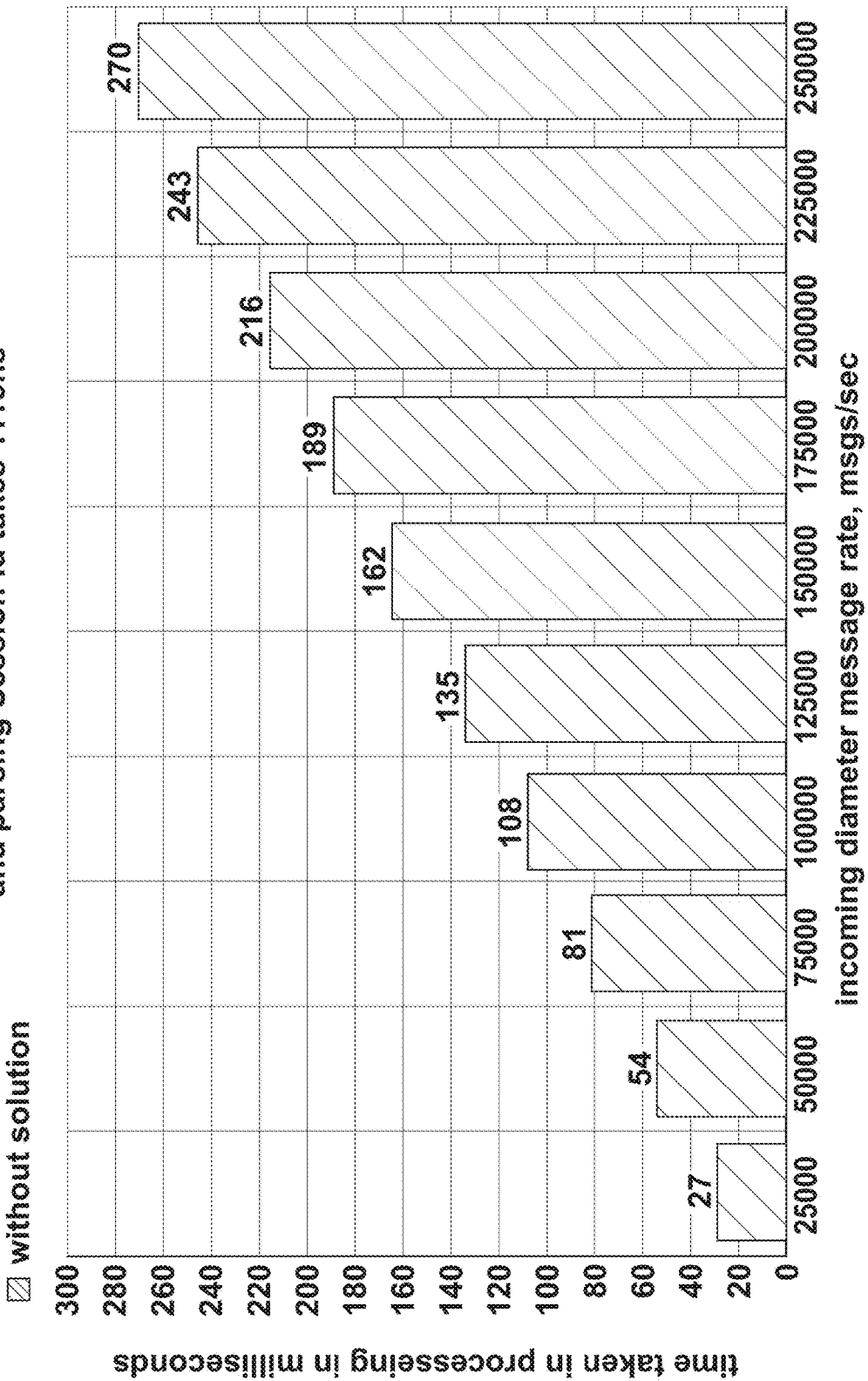
FIG. 7 is a graph that shows the active diameter Transactions Per Second (TPS). versus Central Processing Unit (CPU) usage.

FIGS. 6 and 7 illustrate graphs showing the increased memory and processing activity with increased active diameter sessions. As can be seen from FIG. 6, memory consumption becomes increasingly high with the number of active sessions. Further, from FIG. 7, the processor usage goes higher with higher diameter TPS.

Figure 8:
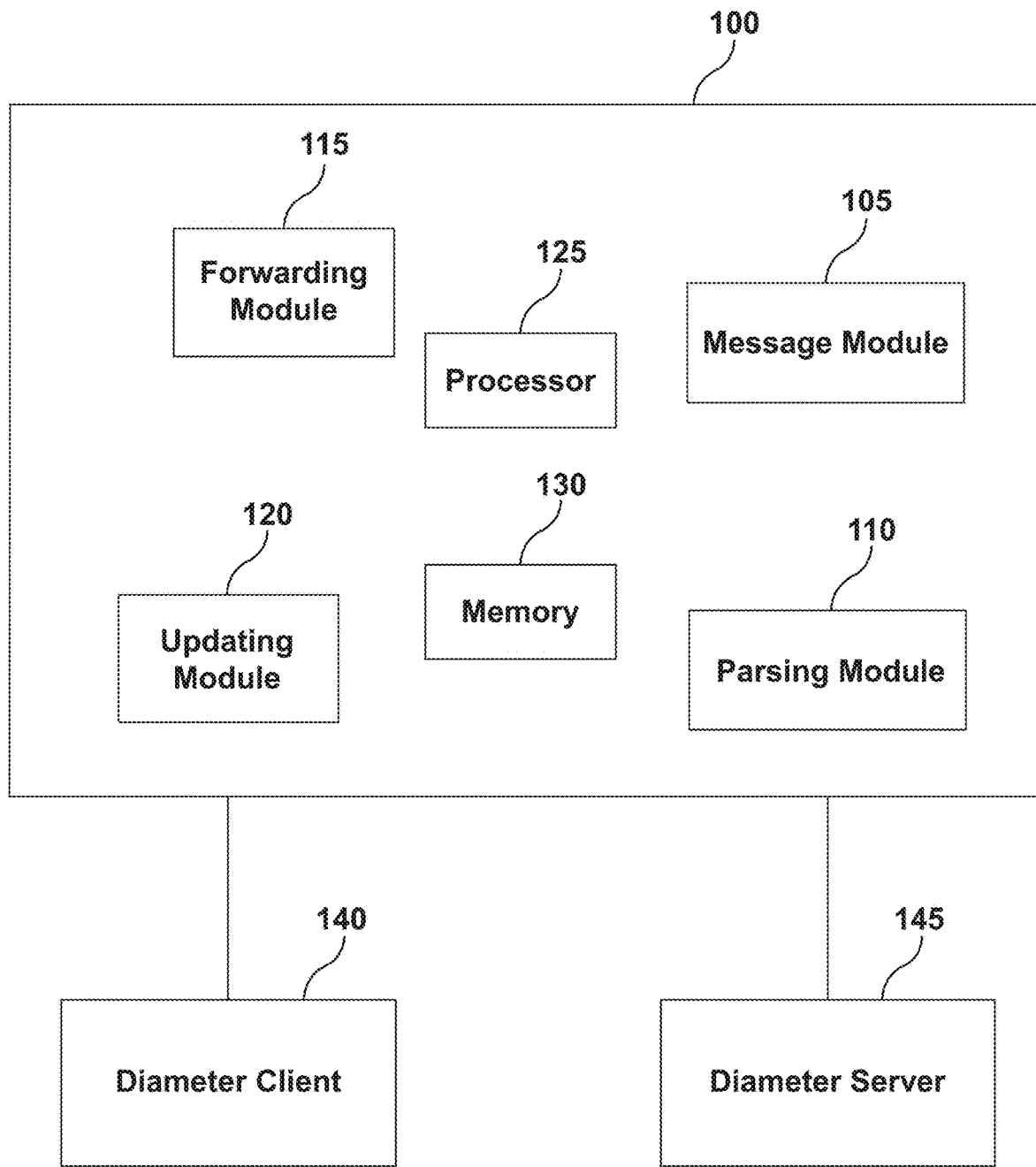
FIG. 8 illustrates a system for stateless diameter load balancing according to an example embodiment.

FIG. 8 illustrates a system 100 for stateless Diameter load balancing, according to an embodiment. The system 100 includes a message module 105, a parsing module 110, a forwarding module 115, an updating module 120, a processor 125 and memory 130. In some cases, the system 100 may include a plurality of processors, for example, including at least one processor per module or per engine. In some cases, the system 100 may be distributed and may be housed in a plurality of network devices. In other cases, the system may reside in a single network device. In some cases, the memory 130 may be included as an internal component of the system. In other cases, the memory component may be housed externally or in a cloud and may be operatively connected to the system and the components of the system. The memory may further include instructions that, when executed by the processor 125 allow the modules to perform their configured tasks.

The memory component 130 may be preconfigured or may be initialized by the processor 125 to create a table. It is intended that the table provide for mapping of a subscriber to Diameter client 140. The subscriber may be associated with a partition-id and the Diameter client 140 may be mapped to the partition-id. It will be understood that the table may also include server and partition-id mapping or separate similar table may be included for this mapping. Whenever the cluster has a change, the load balancer gets notifications from the cluster nodes about the partitions. Further, whenever a load balancer restarts or is newly added, cluster nodes detects that there is a load balancer added in the network and then cluster nodes send the partition-id to cluster nodes map to the load balancer. Further, whenever rebalancing happens, clusters again push the table with new information, which is intended to include partition-id, to cluster nodes mapping to load balancer.

As a cluster is intended to know about all load balancer nodes, whenever a load balancer starts up or becomes online, the load balancer will register with the cluster. During registration, the load balancer will provide information stating that it is a load balancer and the load balancer information may be saved in the memory component 130 of the system 100.

The message module 105 may be configured to receive a message and determine if a sender of the message is the client 140 or a server 145 to determine which table would be associated with the message.

The parsing module 110 is configured to parse the message to determine the partition-id associated with the message. The parsing module 110 may further be configured to perform a lookup in the tables stored in the memory component 130 to determine the client 140 or server 145 intended to receive the message.

The forwarding module 115 is configured to forward the message to the appropriate client 140 or server 145 received from the parsing module 110.

The updating module 120 is configured to update the tables stored in the memory component when the system receives an updated with respect to any client or server that has had a failure or has otherwise had a redistribution among the subscribers previously associated with the client or the server.

The system 100 may further include or may be operatively connected with at least one client node 140 and at least one server node 145. It will be understood that the load balancer is frequently connected to a plurality of clients and a plurality of servers. It is intended that the client and server nodes operatively connected with the system are preconfigured to provide AVPs with partition-ids to the load balancer by encoding the partition-id into the AVP. In some cases, the client 140 or server 140 may provide an Origin-Host AVP with the partition-id as part of the text. In other cases, the server may provide a Session-Id AVP, which includes partition-id which may be parsed by the parsing module 110.

Figure 9:
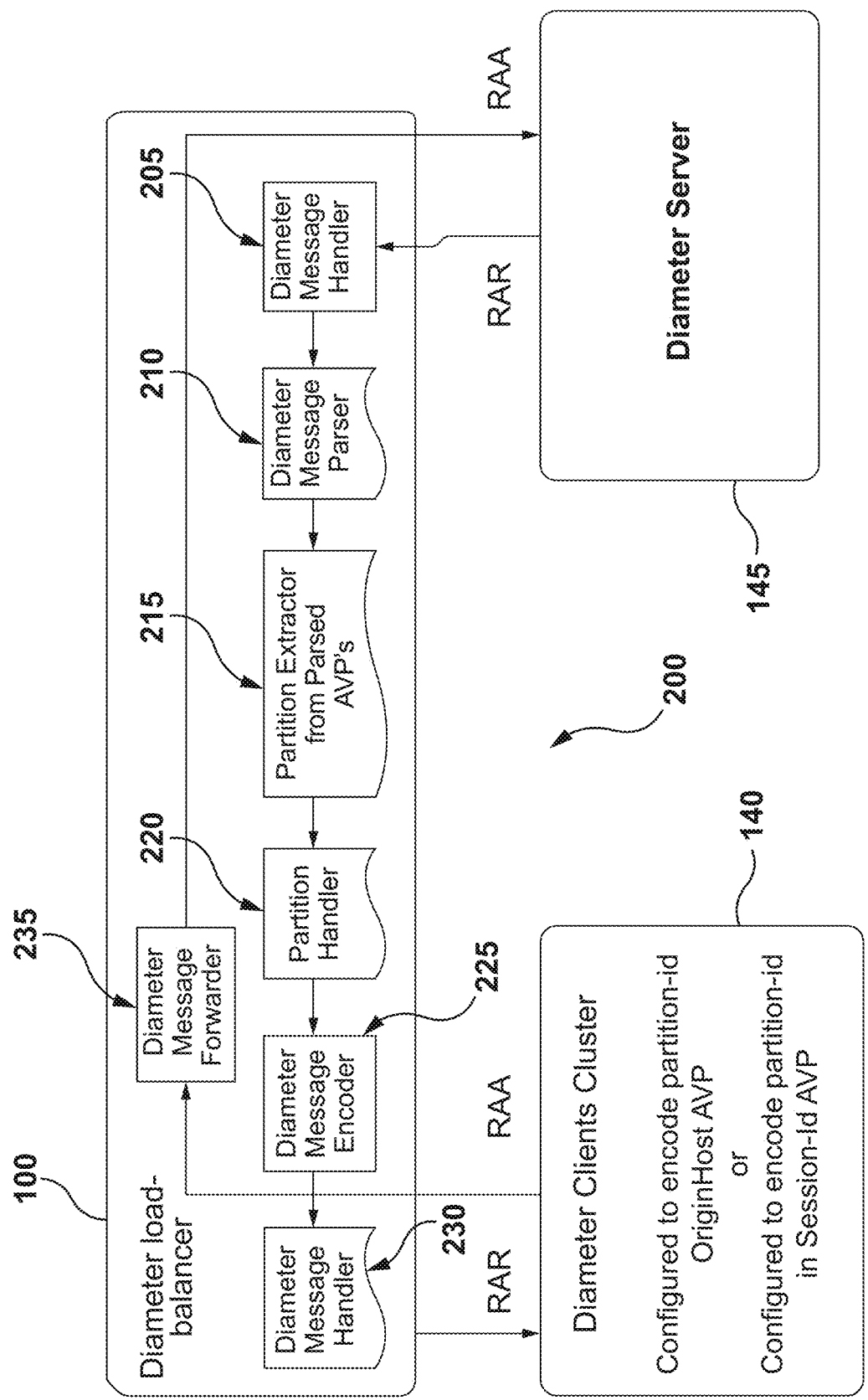
FIG. 9 illustrates a method for stateless diameter load balancing according to an example embodiment.

FIG. 9 illustrates a method 200 for diameter agent stateless load balancing according to an embodiment. It will be understood that the system is configured to determine subscriber partition id and associated client and/or server mapping to the subscriber partition id. At 205, the system receives a message or request, for example, a RAR, that the diameter agent is to forward. The message is reviewed by the messaging module 105. At 210, the parsing module 110 is configured to parse the message to determine at least one AVP and a partition-id associated with the AVP and at 215 the parsing module 110 extracts a partition-ID from the parsed AVPs, which has been encoded by the sender of the message. The parsing module 110 may perform a lookup, based on the partition-id, to determine the recipient of the message. The messages received by the system will have Destination-Host AVP. It is intended that the Destination-Host AVP will have Partition-Id that can be parsed.

In the examples detailed below, a client will answer the first request message and the answer contains Origin-Host AVP and this AVP has partition-id as part of the text. The client encodes partition-id in Origin-Host AVP. Since client knows that it belongs to failover cluster, it is configured to include the partition-id in Origin-Host AVP. The client answer will be received by the server. Subsequently, when the server initiates a request, the server is intended to use the received Origin-Host in the Destination-Host AVP of outgoing request.

At 220, the forwarding module 115 may review the partition ID and determine the recipient of the message for example, from the lookup of the table. At 225, the message may be encoded and then may be forwarded at 230 to the recipient, the client.

At 235, the system may further review any response from the client to the server.

It will be understood that the update module 120 monitors for any changes or updates in the clients and servers that would result in updating the mapping of client and/or server with the partition-id. It will be understood that the update module 120 may continuously be reviewing or determining updates to the mapping.

Embodiments of the system and method described herein are generally intended to use Origin-Host AVP from the client or server initiated Diameter messages to allow the Diameter Agent to remain stateless while continuing to allow messages to be delivered to the appropriate server or client.

The Origin-Host AVP (AVP Code 264) is of type DiameterIdentity, and it is present in all Diameter messages. This AVP identifies the endpoint that originated the Diameter message. Relay agents do not modify this AVP, as noted above. The value of the Origin-Host AVP is intended to be unique within a single host.

Some embodiments of the system and method herein are intended to provide for the TDF to encode the partition-id in the Origin-Host AVP of the TSA at the beginning of a session, so that the Origin-Host AVP in TSA would look like <partition-id>.tdf.example.com.

As the Diameter Agent forwards this TSA without modifying Origin-HOST AVP, and now when RAR is triggered from PCRF, RAR has Destination-Host AVP with <partition-id>.tdf.example.com. This addition is intended to allow for the Diameter Agent to extract the partition-id from the Destination-Host AVP and lookup in a table that is keyed by partition-id and has value as TDF ids.

The Diameter Agent is able to determine the TDF identity from the AVP and the Diameter Agent is able to forward the message to TDF. An example of the method for stateless Diameter Agent load balancing is shown in a sequence diagram in FIG. 10.

The Diameter Load Balancer/proxy/relay is preconfigured with the subscriberName to PCEF/TDF mapping. Whenever subscribers move across diameter clients, the Diameter Agent is notified and updates the table T1. As noted previously, table T1 is configured to provide detail with respect to the partition-id, which in the case may be a hash of subscriberName as key and value as TDF/PCEF ID.

On subscriber login, the PCRF is configured to send the TSR with Subscription-Id AVP with value "sub1" and Session-Id AVP "ap7.example.com;1876543210;523". The Diameter Load Balancer/relay/proxy, parses Subscription-Id AVP and Session-Id AVP. Then is configured to perform a lookup using, for example, a hash of Subscription-Id (for example, partition-id) in the table T1 and to determine the host where this request is to be sent.

The Diameter TSR is forwarded to the peer located in the table T1, for example, TDF1. The TSA is sent from TDF, with Origin-Host AVP as 1.tdf.example.com. The Diameter Load Balancer/relay/proxy forwards the response to the PCRF. It is intended that the Load balancer is not required to look at Origin-Host AVP. The client and load balancer are intended to be part of the same group or the same failover cluster (for example, the same vendor). As such client is intended to be configured to encode partition-id in the Origin-Host AVP.

Figure 10:
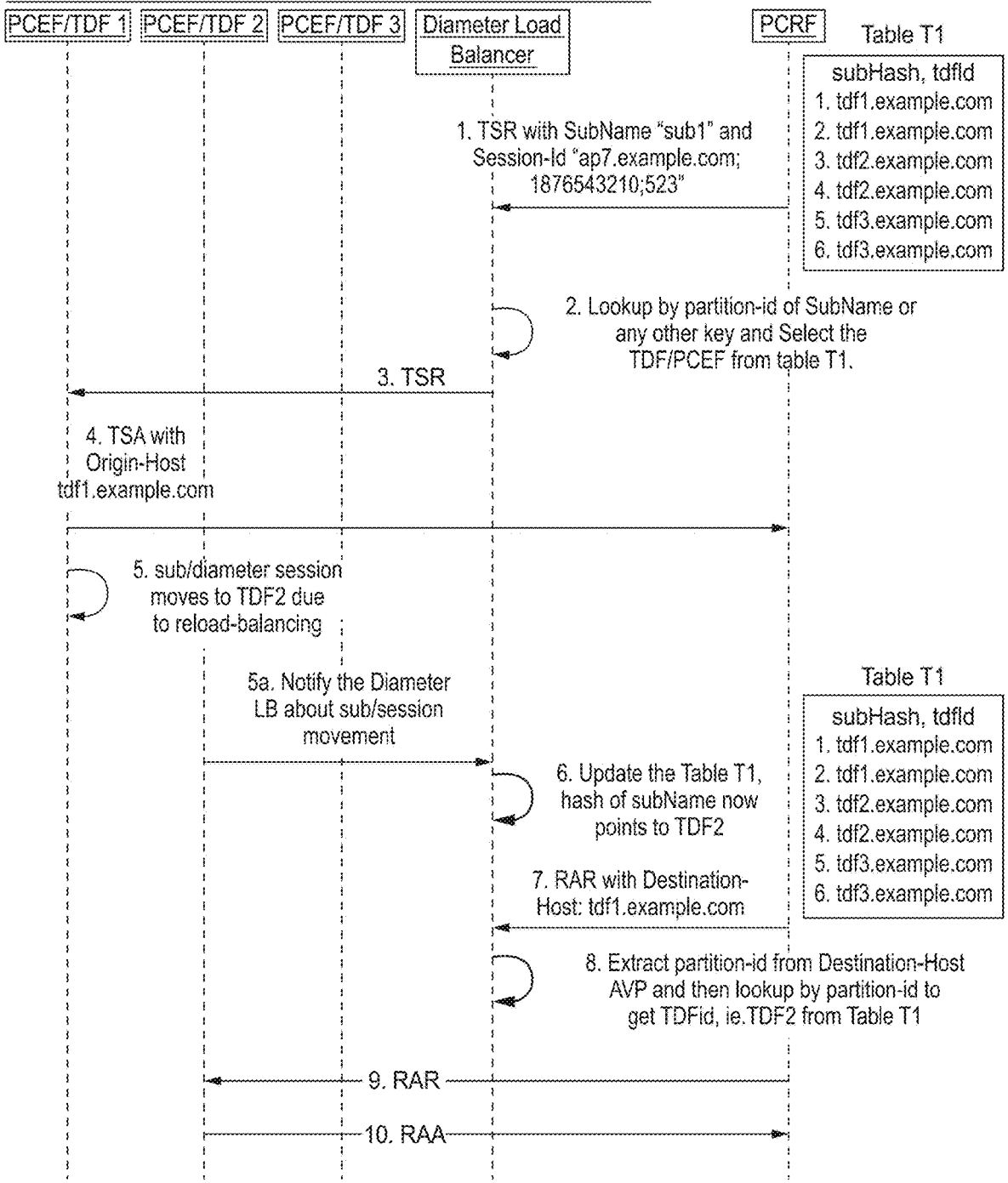
FIG. 10 is a sequence diagram according to an embodiment of the method for stateless diameter load balancing.

In this example, the TDF1 may have a failure, otherwise goes down, or due to some load balancing condition change, all the diameter sessions from TDF1 are moved across to other peers, TDF2 and TDF3 in this example. As can be seen in FIG. 10, "sub1" moves to TDF2. The Diameter Load Balancer/relay/proxy is notified about the subscriber movement.

The Diameter Agent (also referred to as Diameter Load Balancer/relay/proxy) is configured to update table T1. These actions may be performed in manners that are understood in the art. The Diameter Agent receives an RAR from the PCRF with Destination-Host AVP with value same as sent in Origin-Host—1.tdf.example.com, as detailed herein.

The Diameter Agent is configured to parse or otherwise extract the partition-id from Destination-Host AVP. The Diameter Agent further determine, for example, using partition-id look up in table T1, the appropriate TDF for the RAR. The Diameter Agent determines from the T1 lookup that the result is tdf2 for "sub1". The RAR message is forwarded to TDF2

The RAA is sent back to Diameter Agent and the Diameter Agent sends the message to the PCRF. From the above sequence diagram, the system and method for stateless Diameter Agent load balancing is not required to maintain a table similar to Table 2 in the past examples.

In another embodiment, the system and method may be configured to use Session-Id AVP from a client initiated message. The Session-Id AVP (AVP Code 263) is of type UTF8String and is used to identify a specific session. All messages pertaining to a specific session include only one Session-Id AVP, and the same value is used throughout the life of a session. The Session-Id is intended to be globally and eternally unique, as it is meant to uniquely identify a user session.

The Session-Id is intended to begin with the sender's identity encoded in the DiameterIdentity type. The remainder of the Session-Id is often delimited by a ";" character, and, in some cases, may be any sequence that the diameter client can guarantee to be unique. In general, the following format is recommended, (square brackets [ ] indicate an optional element):

<DiameterIdentity>;<high 32 bits>;<low 32 bits>[;<optional value>]

where the <optional value> is implementation specific, but may include a modem's device Id, a Layer 2 address, timestamp, or the like.

In a specific example, the Session-Id could be as follows: accesspoint7.example.com;1876543210;523;mobile@200.1.1.88

The Session-Id is created by the Diameter application initiating the session, which, in most cases, is done by a client. The client is intended to be in the same cluster as the system. As such, the client may be preconfigured to encode the partition-id in the Origin-Host AVPs. Embodiments of the system and method proposed herein are intended to have the PCEF encode the partition-id in the Session-Id AVP of the CCR-I, so Session-Id AVP in CCR-I would look like, for example: pcef.example.com;1876543210;523;<partition-id>@200.1.1.88

Once Session is established, and an RAR is triggered from the PCRF, the RAR will have the same Session-Id AVP that was encoded in CCR-I, in this example, pcef.example.com;1876543210;523;<partition-id>@200.1.1.88.

The Diameter Agent is configured to parse this AVP and extract the partition-id from the Session-Id AVP and perform a look up in a table, for example a table similar to T1, that is keyed by partition-id and has value as PCEF ids. Once the Diameter Agent has the PCEF identity and the Diameter agent can forward the message to the PCEF.

Figure 11:
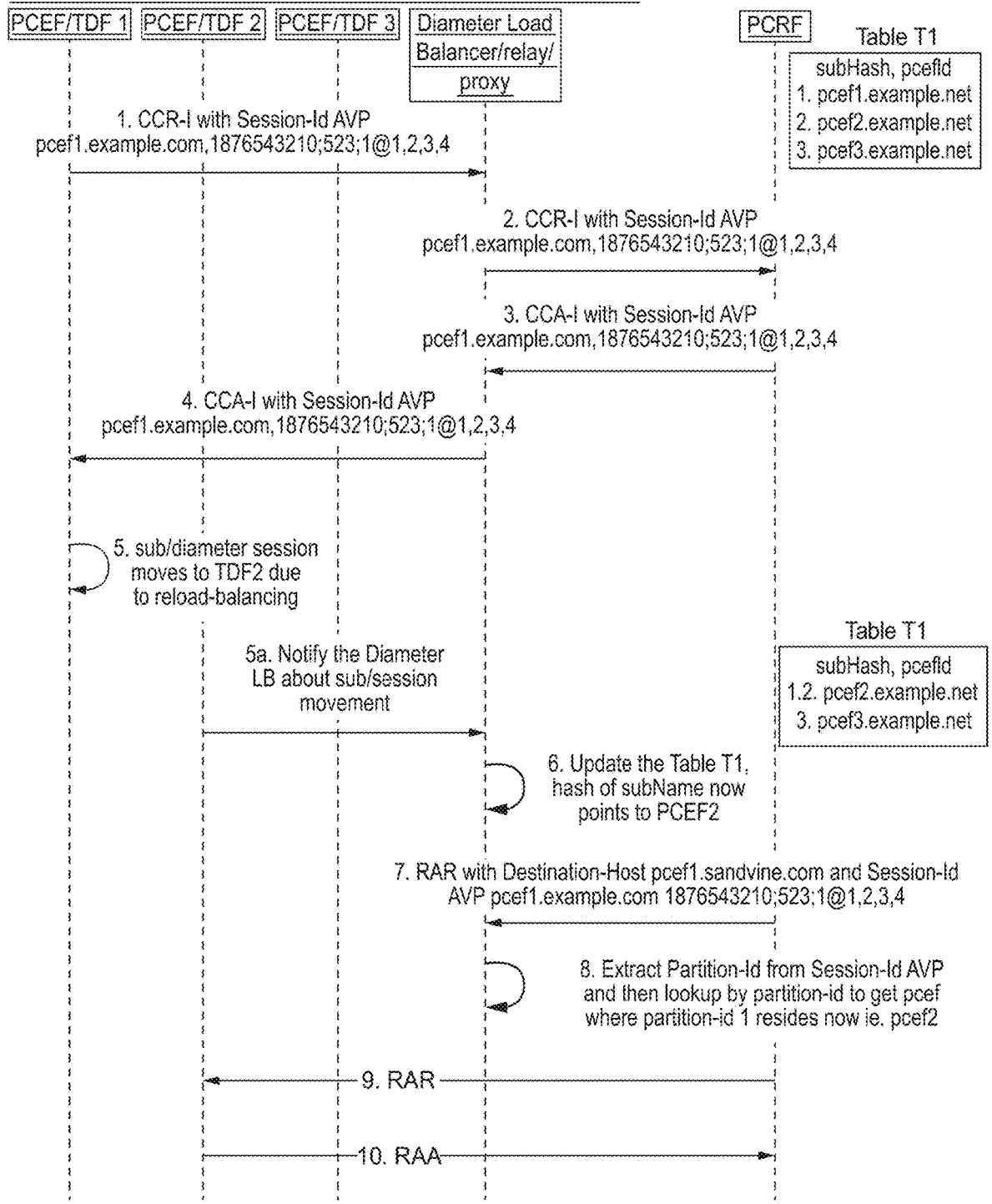
FIG. 11 is a sequence diagram according to another embodiment of the method for stateless diameter load balancing.

FIG. 11 illustrates a sequence diagram of another embodiment of the method for stateless Diameter load balancing. The Diameter Load Balancer/proxy/relay is preconfigured or has been previously made aware of the subscriberName to PCEF/TDF mapping. Whenever subscribers move across diameter clients, the Diameter Agent is notified and the Diameter agent is configured to update the table T1 which, in this example, has hash of subscriberName as key and value as TDF/PCEF ID.

On subscriber login, the PCEF sends the CCR-I with Session-Id AVP with value "pcef1.example.com;1876543210;523;1@1.2.3.4" The Diameter LoadBalancer/relay/proxy is configured to forward the request to PCRF. The PCRF responds with CCA-I to the Diameter Agent. The Diameter Agent then forwards this answer to PCEF.

In this example, the PCEF1 has a failure, goes down, or due to some load balancing condition change, all the diameter sessions from PCEF1 are moved across other peers, for example, PCEF2 and PCEF3. In this case, "sub1" moves to PCEF2. The Diameter Agent is notified about the subscriber movement, and updates table T1.

The Diameter Agent may then receive an RAR message from the PCRF with Destination-Host AVP pointing to pcef1.example.com and Session-Id with value "pcef1.example.com;1876543210;523;1@1.2.3.4". The Diameter Agent is configured to extract the partition-id from Session-Id AVP. Then using partition-id, the Diameter Agent may perform a look up in table T1 and determines that pcef2 is appropriate for "sub1". The Diameter Agent is configured to forward the message to PCEF2. The RAA is sent back to the Diameter Agent and the Diameter Agent sends it to the PCRF.

Figure 12:
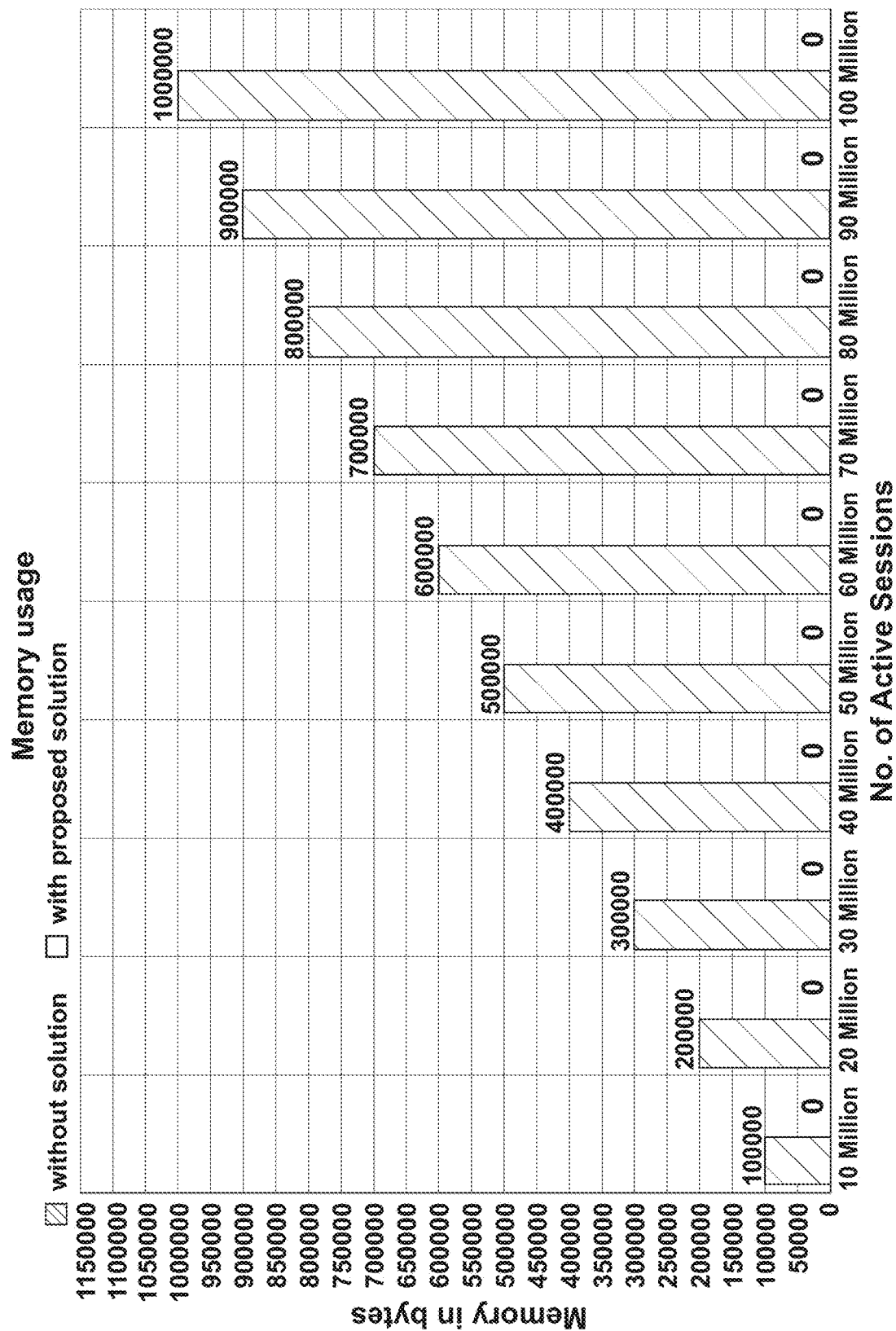
FIG. 12 is a graph showing the comparison of memory usage for a conventional system and the system of stateless diameter load balancing.
Figure 13:
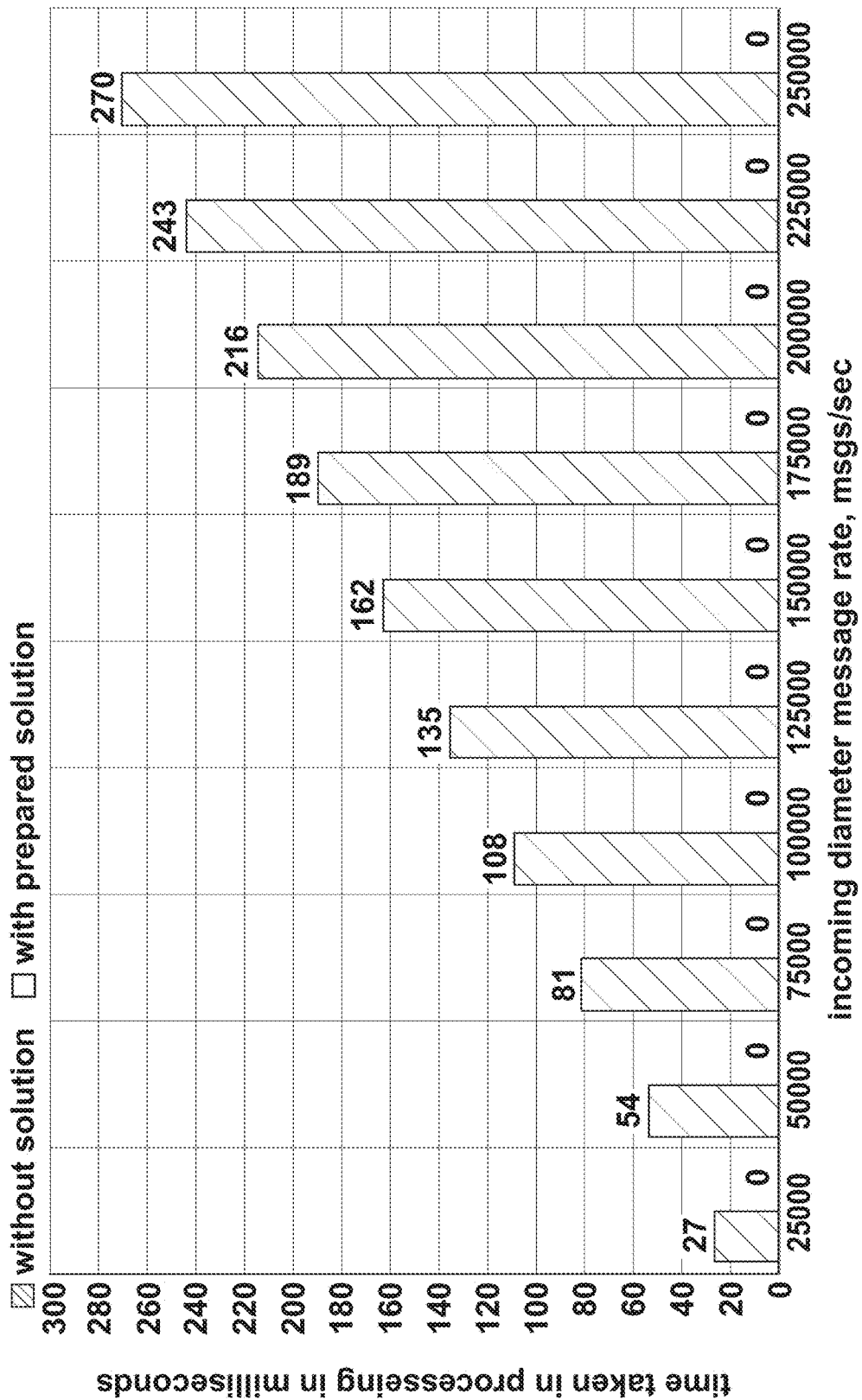
FIG. 13 is a graph showing the comparison of CPU usage for a conventional system and the system of stateless diameter load balancing.

From the graph in FIG. 12, it can be seen that the memory usage remains fairly constant in comparison to conventional solutions. Further, from the graph in FIG. 13, it can be seen that how with the time taken is less than 1 millisecond (ms), which is almost 0ms with the embodiments of the system and method detailed herein. As such, this is a significant saving in processing compared with conventional solutions.

Embodiments of the system and method detailed herein are intended to provide for relatively constant memory consumption. As the embodiments of the system and method do not add bytes to memory usage in RAM there is generally no memory leak. Further, it has been noted that the processing usage remains relatively constant, meaning the system and method detailed herein may be significantly faster than conventional solutions.

Embodiments of the system and method herein are intended to alleviate at least some of the difficulties of maintaining persistency and replication of data. Further, disk usage is intended to be reduced. Still further, the system and method are intended to be stateless, making embodiments of the system and method deployable as a microservice.

Yet still further, the Diameter clients and servers are intended to not need to maintain any extra state to stick a session with particular load balancer. As the embodiments of the system and method are intended to use base diameter protocol, the embodiments are intended to be available for all or most diameter protocols and applications. All diameter protocols use both Session-Id and Origin-Host AVP, so it is intended that the examples provided herein will be compatible for all or most diameter protocols.

Figure 14:
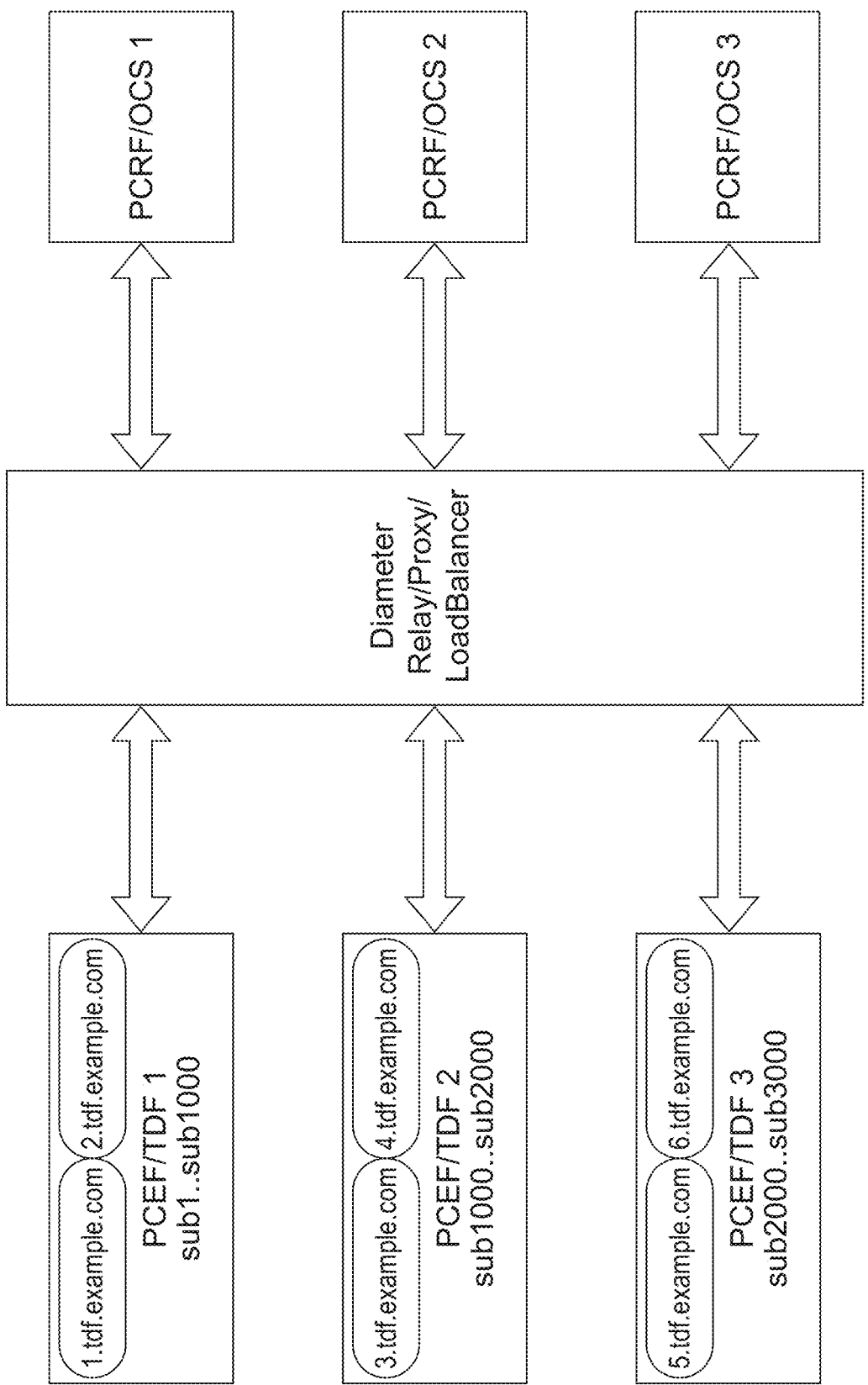
FIG. 14 shows the interaction between diameter client and server for a particular example of an embodiment of the system for stateless diameter load balancing.

In a specific example, as shown in FIG. 14, there may be three TDFs and the subscribers may be divided across 6 partitions such that partition-id can be obtained using hash on subscriber name and moding it using 6.

Partition-id=hash(subName) % 6

This is intended to create 6 virtual diameter clients with name as <partition-id>.tdf.example.com, in this example: 1.tdf.example.com, 2.tdf.example.com, 3.tdf.example.com, 4.tdf.example.com, 5.tdf.example.com, 6.tdf.example.com. In this example, these virtual diameter clients move across the TDF nodes. Whenever TDF replies the TSA Diameter message, the TDF is configured to set Origin-Host based on the subscriber name. If the subscriber name in the Diameter TSR returns Partition-id 3, then Origin-Host in TSA would be 3.tdf.example.com.

The Capability exchange with Diameter Load Balancer is intended to be done from each TDF only once and each TDF opens one Transmission Control Protocol (TCP) connection towards Diameter Load Balancer. The Origin-Host used in the Capability Exchange Request from TDF would have <tdf-id>.example.com, so TDF1 would use tdf1.example.com, TDF2 would use tdf2.example.com, TDF3 would use tdf3.example.com. Capability exchange request is the type of message sent between two diameter nodes when the nodes establish TCP connection with each other. In this message, both peers advertise supported diameter applications by each peer.

The Diameter Agent (Load Balancer/relay/proxy), while routing the server initiated messages, is configured to extract the partition-id from Destination-Host AVP, in this case Destination-Host would be same as the one sent in Origin-Host of TSA. Once Partition-Id is extracted, then perform a lookup of the Partition-id to TDF table, and select the TDF and route the RAR to selected TDF.

In order to make Origin-Host encoded in TSA DNS resolvable, whenever partitions move across the Diameter nodes, the DNS server could be updated with moved diameter peer's new IP address, for example, if 1.tdf.example.com moves to TDF2, then DNS server could be updated where now 1.tdf.example.com resolves to IP address of the TDF2. The identity used in the Origin-Host field of the TSA is resolvable DNS name and the DNS server is to be updated whenever partitions move.

The DNS server is intended to be updated whenever partitions move. The identity used in the Origin-Host field of the TSA is resolvable to the DNS name. When the embodiments of the system and method are applied towards the cluster of Diameter Servers, then Diameter Server can respond back in the session creation response message's Origin-Host AVP (for example, Origin-Host AVP in Diameter Controlled Channel Access (CCA)) the partition-id of the subscriber. When a subscriber moves across servers, client initiated messages can still be delivered using partition-id from the Destination-Host AVP of the client initiated diameter message.

Embodiments of the system and method are intended to be applicable for diameter proxy/diameter agent/diameter relay/diameter load balancer/diameter client/diameter server, or any other diameter nodes. Partition-id are intended to be clearly defined. This method may be used to make load balancers in cluster stateless. It is intended to be applicable to client clusters and/or server clusters.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for diameter load balancing, the method comprising:
    receiving a request from a sending diameter node;
    parsing at least one Attribute-Value Pair (AVP) from the request;
    determining an encoded partition-identifier (partition-id) from the at least one AVP, wherein the partition-id is a hash of a subscriber's identification of the subscriber associated with the request and the subscriber's associated node;
    determining a receiving diameter node, based on the partition-id;
    sending the request to the receiving diameter node; determining the partition-id associated with each subscriber of a plurality of subscribers;
    mapping the partition-id to at least one diameter node;
    receiving a message indicating a failure of the at least one diameter node;
    remapping the partition-id to a different diameter node based on the failure of the at least one diameter node; and
    storing the mapping in a table.

2. The method according to claim 1, wherein the at least one AVP is an Origin-Host AVP or a Session-ID AVP.

3. The method according to claim 1, wherein the sending diameter node is a client node or a server node.

4. The method according to claim 3, wherein when the sending diameter node is the client node, the receiving diameter node is the server node, or when the sending diameter node is the server node, the receiving diameter node is the client node.

5. The method according to claim 1, wherein the table is stored at a load balancing diameter node.

6. The method of claim 1, further comprising:
    encoding the partition-id, via the sending diameter node, into the at least one AVP of the request.

7. A system for diameter agent load balancing, the system comprising at least one processor and at least one memory component including instructions that, when executed, cause the at least one processor to implement:
    a message module configured to receive a request from a sending diameter node;
    a parsing module configured to parse at least one Attribute-Value Pair (AVP) from the request and determine an encoded partition-identification (partition-id) from the at least one AVP, wherein the partition-id is a hash of a subscriber's identification of the subscriber associated with the request and the subscriber's associated node, and determine a receiving diameter node, based on the partition-id;
    a forwarding module configured to send the request to the receiving diameter node;
    an updating module configured to:

determine the partition-id associated with each subscriber of a plurality of subscribers and map the partition-id to at least one diameter node;
receive a message indicating a failure of the at least one diameter node;
remap the partition-id to a different diameter node based on the failure of the at least one diameter node; and
store the mapping in a table.

8. The system according to claim 7, wherein the at least one AVP is an Origin-Host AVP or a Session-ID AVP.

9. The system according to claim 7, wherein the sending diameter node is a client node or a server node.

10. The system according to claim 9, wherein when the sending diameter node is the client node, the receiving diameter node is the server node, or when the sending diameter node is the server node, the receiving diameter node is the client node.

11. The system according to claim 7, wherein the table is stored at a load balancing diameter node.

12. The system according to claim 7, wherein the system further comprises at least one client node or at least one server node and the at least one client node or the at least one server node is configured to encode the partition-id into the at least one AVP.

* * * * *